US011592376B2

(12) United States Patent
Peterson et al.

(10) Patent No.: US 11,592,376 B2
(45) Date of Patent: Feb. 28, 2023

(54) SAFETY SYSTEMS AND MATERIAL TESTING SYSTEMS INCLUDING SAFETY SYSTEMS

(71) Applicant: Illinois Tool Works Inc., Glenview, IL (US)

(72) Inventors: Martin Allen Peterson, Wrentham, MA (US); Earl H. Landry, Stoughton, MA (US); Eric Thomas Stuebe, Needham, MA (US); Fernando L. Castro, Westwood, MA (US); Jaron Burnworth, Norwood, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 364 days.

(21) Appl. No.: 16/697,873

(22) Filed: Nov. 27, 2019

(65) Prior Publication Data
US 2020/0173893 A1    Jun. 4, 2020

Related U.S. Application Data

(60) Provisional application No. 62/773,895, filed on Nov. 30, 2018.

(51) Int. Cl.
*G01N 3/08* (2006.01)
*G01N 3/06* (2006.01)

(52) U.S. Cl.
CPC ............. *G01N 3/06* (2013.01); *G01N 3/08* (2013.01); *G01N 2203/0204* (2013.01)

(58) Field of Classification Search
CPC .............. G01N 3/08; G01N 2203/16; G01N 2203/0202; G01N 2203/0204; G01N 2203/0016
See application file for complete search history.

(56) References Cited

U.S. PATENT DOCUMENTS

2009/0199663 A1    8/2009   Kaneda
2013/0055823 A1*   3/2013   Kawano ................ G01N 3/08
                                                73/805

FOREIGN PATENT DOCUMENTS

| JP | 2012063171 | 3/2012 |
| WO | 2016139147 | 9/2016 |
| WO | 2017176568 | 10/2017 |

OTHER PUBLICATIONS

Int'l Search Report and Written Opinion Appln No. PCT/US2019/063874 dated Jul. 14, 2020.

(Continued)

*Primary Examiner* — Erika J. Villaluna
(74) *Attorney, Agent, or Firm* — McAndrews, Held & Malloy, Ltd.

(57) ABSTRACT

Safety systems and material testing systems including safety systems are disclosed. An example material testing system includes: an actuator configured to control an operator-accessible component of the material testing system; an actuator disabling circuit configured to disable the actuator; and one or more processors configured to: control the actuator based on a material testing process; monitor a plurality of inputs associated with operation of the material testing system; determine, based on the plurality of inputs and the material testing process, a state of the material testing system from a plurality of predetermined states, the predetermined states comprising one or more unrestricted states and one or more restricted states; and control the actuator disabling circuit based on the determined state.

17 Claims, 3 Drawing Sheets

(56) References Cited

OTHER PUBLICATIONS

Int'l Search Report and Written Opinion Appln No. PCT/US2019/063875 dated Mar. 20, 2020.

\* cited by examiner

SAFETY SYSTEMS AND MATERIAL TESTING SYSTEMS INCLUDING SAFETY SYSTEMS

RELATED APPLICATIONS

This patent claims priority to U.S. Provisional Patent Application Ser. No. 62/773,895, filed Nov. 30, 2018, entitled "SAFETY SYSTEMS AND MATERIAL TESTING SYSTEMS INCLUDING SAFETY SYSTEMS." The entirety of U.S. Provisional Patent Application Ser. No. 62/773,895 is incorporated herein by reference.

BACKGROUND

This disclosure relates generally to materials testing, and more particularly, to safety systems and material testing systems including safety systems.

Universal testing machines are used to perform mechanical testing, such as compression strength testing or tension strength testing, on materials or components.

SUMMARY

Safety systems and material testing systems including safety systems are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
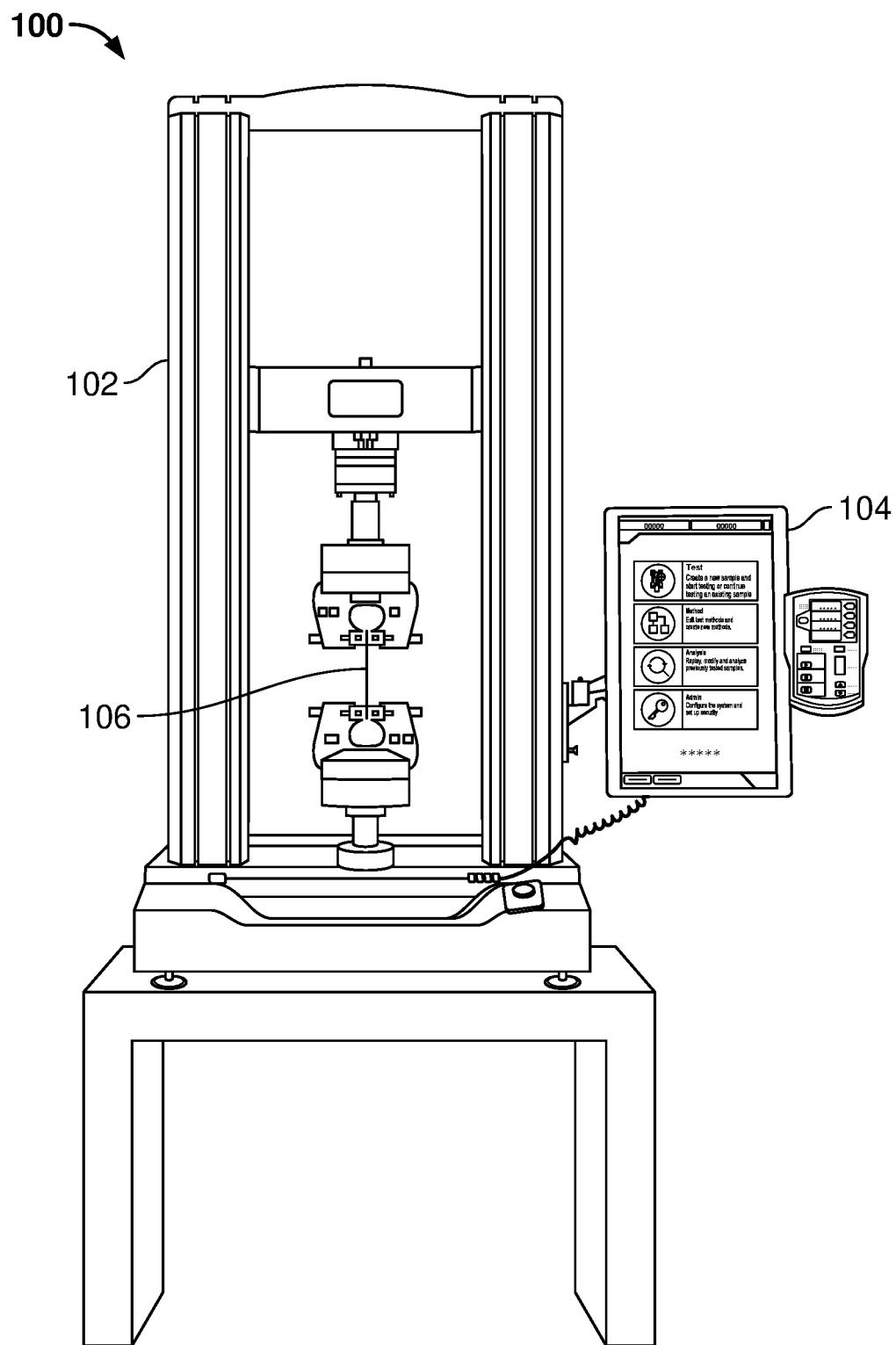
FIG. 1 is an example testing device to perform mechanical property testing, in accordance with aspects of this disclosure.

Conventional material testing systems use mitigation techniques, such as configuration switches, guarding, limited force controls, motion limiting, and/or protection, to improve operator safety. However, conventional material testing systems frequently do not always comply with international standards. Conventional mitigation techniques require the operator to place the system in the appropriate mode of operation, such as safe interaction or testing. Many conventional safety techniques can be implemented using off-the-shelf safety components, such as programmable logic controllers (PLCs) and/or relays. PLCs and relays typically add significant cost to the material testing system.

Disclosed example material testing systems embed or integrate a safety system complying with international standards within the material testing system. Because the safety system is integrated into the material testing systems, disclosed example material test systems provide safety improvements at a much lower cost than would be accomplished using off-the-shelf parts because the safety system is integrated into the existing electronics, semiconductors, and/or circuit boards of the material testing systems. Integration further improves reliability, which reduces or eliminates external wiring between purchased safety components.

As described in more detail below, disclosed example safety systems for material testing systems include machine state indicators that visually show the state of the testing machine from an operational restriction perspective. Disclosed example safety systems for material testing systems provide high reliability and monitored activation mechanisms at the machine point of control, which may include internal fault checking and/or power supply diagnostics within the material testing systems. In some examples, pneumatic grips are provided with two stage grip pressure control and monitoring. Disclosed example material testing systems are compatible with interlock guarding systems having redundant or diverse contacts. Such guarding systems comply with ISO safety standards by using redundant, diverse, and/or dynamic monitoring in real time. Disclosed example material testing systems include redundant crosshead travel limit monitoring. The material testing system shutdown circuitry of disclosed examples is compliant with international safety standards including ISO 13849-1.

Additionally, conventional off-the-shelf safety relay components used with PLCs use an extra layer of firmware within the PLC to stop the motion of the moving components during an emergency stop event. Disclosed example safety systems for material testing systems are configured to enable the hardware (e.g., an emergency stop button) to directly shutdown a power amplifier drive to the actuator(s), regardless of whether the embedded firmware within the safety processor is running.

Disclosed example material testing systems are compliant with the European Machinery Directive, following the rules set forth in the ISO 13849-1 standard, which pertains to the "Safety Related Parts of Control Systems." The following functions, which are determined by a system risk analysis, are integrated into the material testing system. The safety system provides a disabled drive state to remove energy from the drive crosshead, a disabled drive state to remove energy from the gripping system, and a restricted drive state for operator setup. In the restricted drive state, the example safety systems monitor the crosshead speed to maintain the crosshead speed below an upper speed limit, monitor for intentional manual movement (jogging) of the crosshead, monitor for reduced gripping pressure when closing, and/or monitor for intentional grip closure.

As used herein, a "crosshead" refers to a component of a material testing system that applies directional (axial) and/or rotational force to a specimen. A material testing system may have one or more crossheads, and the crosshead(s) may be located in any appropriate position and/or orientation in the material testing system.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling. Firmware may include stored instructions such as Safety Rated Embedded Software (SRESW) and/or Safety Rated Application Software (SRASW).

The disclosed example material testing systems further include an unrestricted drive state, which enables the removal of checks in the restricted drive state. In some examples, the unrestricted drive state can be entered via a dual activation mechanism, in which material testing functionality is performed and the operator does not interact with the system.

Disclosed example material testing systems include indicators for different states, such as a disabled state, a setup state (e.g., restricted drive mode), a caution state (e.g., unrestricted drive mode), and a testing state (e.g., unrestricted drive mode) indication on every machine to clearly indicate when the operator may interact and when a hazard is present.

Disclosed example material testing systems include one or more stop functions that are configured to take precedence over the starting and/or continuation of motion of components such as the crosshead or grips. Furthermore, one or more stop functions may be redundantly configured via hardware such that the stop functions are effective to disable the material testing system even when software portions of the safety system are disabled. Examples of such stop functions that may be included in disclosed systems include interlocked guards and/or emergency stop switches.

Some disclosed example material testing systems include selection and enforcement of a single control point for starting the material testing frame and/or gripping system. Some example systems provide power failure monitoring and/or protection to ensure the system stops unrestricted operation and places the material test system into the disabled drive state upon re-establishment of power. In some examples, in response to a power failure, any pneumatic specimen gripping is automatically de-energized.

Disclosed example safety systems and material testing systems include increased internal diagnostics and reporting to the operator of critical errors within the system, such as malfunctions of equipment or conflicts between redundant inputs, outputs, and/or processes. Disclosed example material testing systems enable faster specimen removal and/or insertion, relative to conventional material testing systems, due to the safe setup mode of the testing machine that permits operator activity within the test space without disabling of the material testing system or requiring guard doors. Disclosed example material testing systems further improve operator safety when setting up and configuring the system inside the test space, due at least in part to use of the setup state, which restricts motion of the crosshead and/or limited motion and/or force that can be exerted by the grips.

Disclosed material testing systems and safety systems may be specially configured to be utilized in the disclosed example configurations, to achieve identified risk mitigations. Disclosed material testing systems are significantly more efficient and targeted to materials testing than purchasing general purpose, off-the-shelf, discrete safety components.

Disclosed example material testing systems include: an actuator configured to control an operator-accessible component of the material testing system; an actuator disabling circuit configured to disable the actuator; and one or more processors configured to: control the actuator based on a material testing process; monitor a plurality of inputs associated with operation of the material testing system; determine, based on the plurality of inputs and the material testing process, a state of the material testing system from a plurality of predetermined states, the predetermined states comprising one or more unrestricted states and one or more restricted states; and control the actuator disabling circuit based on the determined state.

In some example material testing systems, the one or more processors include a safety processor having a plurality of processing cores configured to: execute redundant code to monitor the plurality of inputs and to determine the state of the material testing system; and compare outputs of the redundant code, wherein at least one of the control of the actuator disabling switch or control of a state output indicator is based on the comparison of the outputs. In some examples, the plurality of inputs includes a guarding input configured to indicate whether an operator is within a predetermined volume around the material testing system, and the one or more processors are configured to set the state of the material testing system in response to determining that the operator is within the predetermined volume.

Some example material testing system further include at least one of a mechanically interlocked guard door or a light curtain, configured to output the guarding input. In some examples, the one or more processors are configured to limit a speed of the actuator in response to the guarding input.

In some examples, the operator-accessible component includes an automatic grip or a manual grip configured to grip a material under test, in which the actuator is configured to actuate the automatic grip or the manual grip, and further includes: a crosshead configured to move the automatic grip or the manual grip to position the automatic grip or the manual grip or apply force to the material under test held by the automatic grip or the manual grip; and a second actuator configured to actuate the crosshead, wherein the one or more processors are configured to limit at least one of the actuator or the second actuator based on the state of the material processing system. Some example material testing systems further include a plurality of speed sensors configured to monitor a speed of the crosshead, and the one or more processors configured to: limit the speed of the crosshead; compare speeds detected by the speed sensors; and, when the compared speeds have more than a threshold difference, at least one of: a) set the state of the material testing system or b) disable operation of the material testing system.

In some examples, the one or more processors are configured to: when the material testing system is in any of the one or more restricted states, limit a pressure that can be applied by the automatic grip to less than a threshold force; and when the material testing system is in one or more of the unrestricted states, enable the actuator to exceed the threshold force that may be applied by the automatic grip.

In some examples, the plurality of inputs include an emergency stop input coupled to at least one of the one or more processors or the actuator disabling circuit, in which at least one of the one or more processors or the emergency stop input is configured to control the actuator disabling circuit to disconnect the actuator from the source of energy for the actuator. In some examples, the one or more processors are configured to control the actuator disabling circuitry to continue disconnection of the actuator from the source of energy after the emergency stop input is released until the one or more processors identify a user interaction to reconnect the actuator to the source of energy.

Some example material testing systems further includes an actuator braking circuit configured to, in response to a signal to disconnect the actuator from a source of energy, decelerate the actuator prior to the disconnection. In some examples, the one or more processors are configured to: determine whether the actuator is decelerating by at least a threshold deceleration; and, in response to determining that the actuator is not decelerating by at least the threshold deceleration, disconnect the actuator.

Some example material testing systems further include a power supply monitor circuit configured to monitor a power supply of the material testing system, in which the one or more processors are configured to at least one of set the state of the material testing system or disable operation of the material testing system in response to a signal from the power supply monitor circuit indicating that the power supply is out of tolerance.

In some examples, the state output indicator includes at least one of a plurality of lights corresponding to the one or more unrestricted states and the one or more restricted states, or a display configured to display information about the material testing system. In some examples, the one or more processors are configured to: monitor the state output indicator; and at least one of set the state of the material testing system or disable operation of the material testing system in response to detecting that the state output indicator is not outputting a state corresponding to the determined state.

In some examples, the one or more unrestricted states include: a caution state in which the one or more processors are reducing restrictions on the actuator and are not controlling the actuator to perform testing; and a testing state in which the one or more processors are reducing restrictions on the actuator and are controlling the actuator to perform testing. In some examples, the one or more restricted states include: a setup state in which the one or more processors are restricting the actuator and controlling the actuator in response to operator inputs; and a disabled state in which the one or more processors are restricting the actuator and do not control the actuator in response to operator inputs.

In some examples, the actuator includes at least one of an electric motor, a pneumatic actuator, a hydraulic actuator, a piezoelectric actuator, a relay, or a switch. In some examples, the one or more processors include: a control processor configured to perform the control of the actuator; and one or more safety processors configured to perform the monitoring of the plurality of inputs, the determining of the state of the material testing system, and the controlling of the actuator disabling circuit.

FIG. 1 is an example material testing system 100 to perform mechanical property testing. The example material testing system 100 may be, for example, a universal testing system capable of static mechanical testing. The material testing system 100 may perform, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally or alternatively, the material testing system 100 may perform dynamic testing.

The example material testing system 100 includes a test fixture 102 and a computing device 104 communicatively coupled to the test fixture 102. The test fixture 102 applies loads to a material under test 106 and measures the mechanical properties of the test, such as displacement of the material under test 106 and/or force applied to the material under test 106. While the example test fixture 102 is illustrated as a dual column fixture, other fixtures may be used, such as single-column test fixtures.

The example computing device 104 may be used to configure the test fixture 102, control the test fixture 102, and/or receive measurement data (e.g., transducer measurements such as force and displacement) and/or test results (e.g., peak force, break displacement, etc.) from the test fixture 102 for processing, display, reporting, and/or any other desired purposes.

Figure 2:
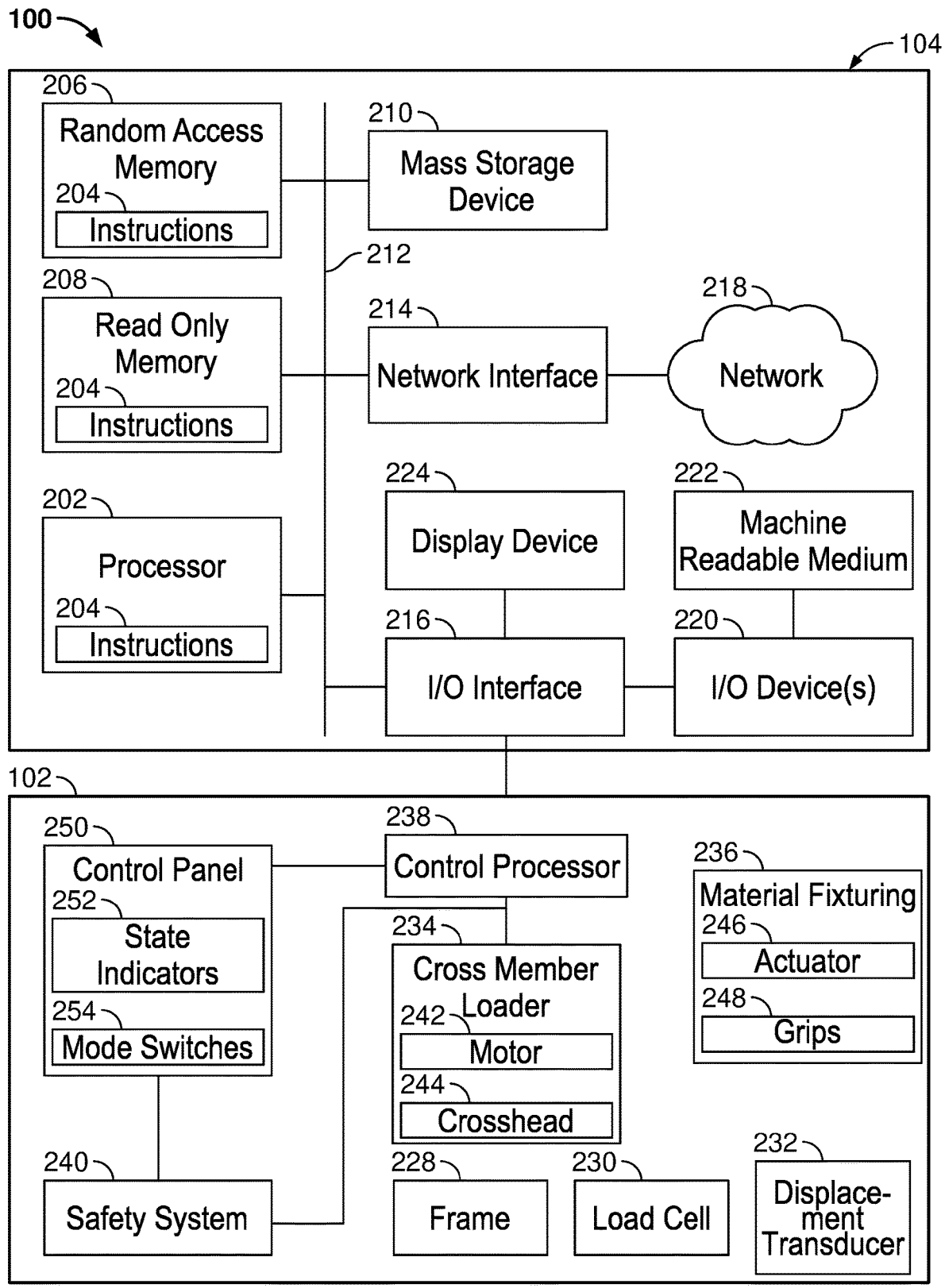
FIG. 2 is a block diagram of an example implementation of the testing device of FIG. 1.

FIG. 2 is a block diagram of an example implementation of the material testing system 100 of FIG. 1. The example material testing system 100 of FIG. 2 includes the test fixture 102 and the computing device 104. The example computing device 104 may be a general-purpose computer, a laptop computer, a tablet computer, a mobile device, a server, an all-in-one computer, and/or any other type of computing device.

The example computing device 104 of FIG. 2 includes a processor 202. The example processor 202 may be any general purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the computing device 201 to a communications network 218 such as the Internet. For example, the network interface 214 may include IEEE 202.X-compliant wireless and/or wired communications hardware for transmitting and/or receiving communications.

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface. The example material testing system 100 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example computing device 104 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The example material testing system 100 of FIG. 1 further includes the test fixture 102 coupled to the computing device 104. In the example of FIG. 2, the test fixture 102 is coupled to the computing device via the I/O interface 216, such as via a USB port, a Thunderbolt port, a FireWire (IEEE 1394) port, and/or any other type serial or parallel data port. In some other examples, the test fixture 102 is coupled to the network interface 214 and/or to the I/O interface 216 via a wired or wireless connection (e.g., Ethernet, Wi-Fi, etc.), either directly or via the network 218.

The test fixture 102 of FIG. 2 includes a frame 228, a load cell 230, a displacement transducer 232, a cross-member loader 234, material fixtures 236, a control processor 238, and a safety system 240. The frame 228 provides rigid structural support for the other components of the test fixture 102 that perform the test. The load cell 230 measures force applied to a material under test by the cross-member loader 234 via the grips 236. The cross-member loader 234 applies force to the material under test, while the material fixtures 236 (also referred to as grips) grasp or otherwise couple the material under test to the cross-member loader 234. The example cross-member loader 234 includes a motor 242 (or other actuator) and a crosshead 244. The crosshead 244 couples the material fixtures 236 to the frame 228, and the motor 242 causes the crosshead to move with respect to the frame to position the material fixtures 236 and/or to apply force to the material under test. Example actuators that may be used to provide force and/or motion of a component of the material testing system 100 include electric motors, pneumatic actuators, hydraulic actuators, piezoelectric actuators, relays, and/or switches.

Example grips 236 include compression platens, jaws or other types of fixtures, depending on the mechanical property being tested and/or the material under test. The grips 236 may be manually configured, controlled via manual input, and/or automatically controlled by the control processor 238. The crosshead 244 and the grips 236 are operator-accessible components.

The example control processor 238 communicates with the computing device 104 to, for example, receive test parameters from the computing device 104 and/or report measurements and/or other results to the computing device 104. For example, the control processor 238 may include one or more communication or I/O interfaces to enable communication with the computing device 104. The control processor 238 may control the cross-member loader 234 to increase or decrease applied force, control the fixture(s) 236 to grasp or release a material under test, and/or receive measurements from the displacement transducer 232, the load cell 230 and/or other transducers.

The example safety system 240 provides an additional layer of monitoring and control to the test fixture 102. The safety system 240 monitors operator inputs and the state of the test fixture 102. In the example of FIG. 2, the safety system 240 restricts operation of the test fixture 102 by the user so that the test fixture 102 is only controllable by the user when the machine is in an appropriate state. In response to detecting one or more conditions, the safety system 240 will automatically cause the test fixture 102 to go to a restricted state (e.g., a restricted setup state, disable all power and motion that could present a hazardous condition, etc.).

As discussed in more detail below, the safety system 240 selectively adds, removes, increases, and/or decreases restrictions on operation of the material testing system based on monitoring input signals from the material testing system 100, input signals from the safety system 240, and/or control signals from the control processor 238. The safety system 240 controls operation of the material testing system 100 by determining a state, from multiple predetermined states, in which the material testing system 100 is to be operated at any given time. Example predetermined states include one or more restricted states, in which one or more operations of the material testing system 100 are restricted (e.g., disabled, limited, etc.) and one or more unrestricted states, in which the restrictions of the restricted states are reduced and/or removed. In the example of FIG. 2, the safety processor 240 attaches to and/or interrupts the control of the cross-member loader 234 and/or the fixture(s) 236 by the control processor 238. In some other examples, the safety system 240 may directly control the cross-member loader 234 and/or the fixture(s) 236 while enforcing any applicable restrictions on the actuators.

Example restricted states include a setup state and a disabled state. In the setup state, the safety system 240 restricts one or more actuators (e.g., the motor 242 and/or the grip actuator(s) 246), and controls (or permits control of) the actuators in response to operator inputs. Example restrictions on the motor 242 and/or the crosshead 244 may include an upper speed limit, and/or an upper or lower position limit of the crosshead 244 relative to the test fixture 102. Example restrictions on the grip actuator(s) 246 may include an upper pressure limit and/or an upper grip force limit. In the disabled state, the safety system 240 restricts the actuators and the control processor 238 does not control the actuator in response to operator inputs (e.g., does not attempt to control the motor 242 and/or the grip actuator(s) 246, or is prevented from controlling the motor 242 and/or the grip actuator(s) 246 via de-energization).

Example unrestricted states include a caution state and a testing state. In the example caution state, the safety system 240 reduces restrictions on the actuator (e.g., motor 242 and/or the grip actuator(s) 246), and does not control the actuator(s) motor 242 and/or the grip actuator(s) 246. In the caution state, the control processor 238 may control the actuator(s) to perform actions such as high speed jogging of the crosshead 244 and/or increasing grip force by the pneumatic grips 248, for which the operator should not be physically proximate the crosshead 244 and/or the pneumatic grips 248. In the example testing state, the safety system 240 reduces restrictions on the actuator, while the control processor 238 controls the actuator(s) to perform testing (e.g., in accordance with a material testing procedure or program executed by the control processor 238).

The example material testing system 100 of FIG. 2 may further include one or more control panels 250, including multiple state indicators 252 and one or more mode switches 254. The mode switches 254 may include buttons, switches, and/or other input devices located on an operator control panel. For example, the mode switches 254 may include buttons that control the motor 242 to jog (e.g., position) the crosshead 244 at a particular position on the frame 228, switches (e.g., foot switches) that control the grip actuators 246 to close or open the pneumatic grips 248, a mode control button that is depressed in conjunction with another button to enable the safety system 240 to permit operation in an unrestricted state, and/or any other input devices that could result in operation in an unrestricted state.

The state indicators 252 correspond to a set of predetermined states (e.g., the disabled, setup, caution, and testing states described above) to which the safety system 240 can set the material testing system 100. As described in more detail below, the safety system 240 controls the state indicators 252 to provide an indication as to the present state of the material testing system 100 as determined by the safety system 240. The state indicators 252 may include lights, displays, audio, mechanical systems, and/or any other indication that can be identified by the operator.

Figure 3:
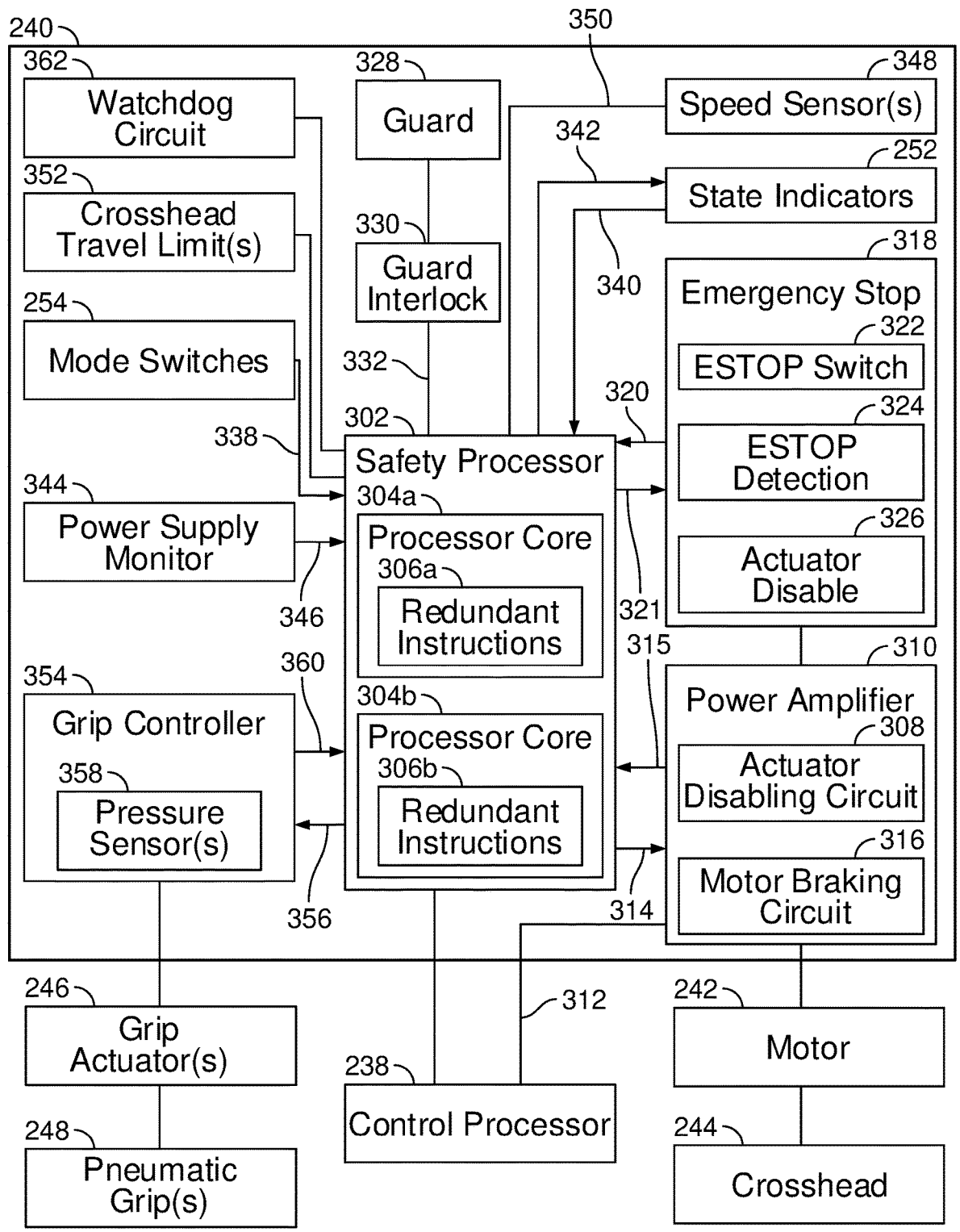
FIG. 3 is a block diagram of an example implementation of the safety system of FIG. 2.

FIG. 3 is a block diagram of an example implementation of the safety system 240 of FIG. 2. As illustrated in FIG. 3, the safety system 240 includes a safety processor 302.

The example safety processor 302 includes multiple, redundant processing cores 304a, 304b. The processing cores 304a, 304b execute redundant instructions 306a, 306b and receive redundant inputs, such that the processing cores 304a, 304b should, during normal operation of the test fixture 102, produce substantially identical outputs. The safety processor 302 (e.g., via the redundant cores 304a, 304b) monitors the plurality of inputs and determines the state of the material testing system 100 based on the inputs. The safety processor 302 may compare outputs of the redundant instructions 306a 306b and control the state of the material testing system 100 based on the comparison of the outputs.

The example safety processor 302 and/or the redundant processing cores 304a, 304b may be include general purpose central processing unit (CPU) from any manufacturer. In some other examples, the safety processor 302 and/or the redundant processing cores 304a, 304b may include one or more specialized processing units, such as RISC processors with an ARM core, graphic processing units, digital signal processors, and/or system-on-chips (SoC). The safety processor 302 and/or the redundant processing cores 304a, 304b execute machine readable instructions, such as the redundant instructions 306a, 306b that may be stored locally at the processor (e.g., in an included cache or SoC), in a storage device such as a random access memory, a read only memory, and/or a mass storage device.

The redundant processing cores 304a, 304b and the redundant instructions 306a, 306b allow redundant and/or diverse inputs and outputs to be processed by the safety system 240, which provides a highly reliable and predictable system. Thus, while representative inputs and outputs are illustrated in FIG. 3, these inputs and/or outputs may be duplicated to support the redundant processing cores 304a, 304b and the redundant instructions 306a, 306b. The redundant instructions 306a, 306b (e.g., embedded software, operating system, and generated code) execute by the safety processor 302 is compliant with the processes outlined in international standards, including but not limited to ISO 13849-1, which pertains to "Safety Related Parts of Control Systems." While the example safety processor 302 includes multiple, redundant processing cores, in other examples the safety processor 302 may include a single processing core, or multiple, non-redundant processing cores.

The safety system 240 of FIG. 3 further includes an actuator disabling circuit 308 that selectively disables a power amplifier 310 from providing energy to the motor 242 of the crosshead 244. Additionally or alternatively, the actuator disabling circuit 308 (or another actuator disabling circuit) may disable the grip actuator(s) 246 from providing energy to the pneumatic grip(s) 248. The power amplifier 310 receives input power and outputs power to the motor 242 to control movement of the crosshead 244. The example actuator disabling circuit 308 and the power amplifier 310 may be implemented using a safety rated Safe Torque Off (STO) high-reliability servo power amplifier. The control processor 238 may control the motor 242 and movement of the crosshead 244 via a motor control signal 312 to the power amplifier 310.

In response to an STO signal 314 from the safety processor 302, the actuator disabling circuit 308 disables the connected actuator (e.g., the motor 242). For example, the actuator disabling circuit 308 may disconnect all energy to the motor 242 (and/or other moving parts in the material testing system 100), in less than a certain defined period of time. The example actuator disabling circuit 308 may provide an STO feedback signal 315 to the safety processor 302, which indicates whether the actuator disabling circuit 308 is currently disabling the actuator. The safety processor 302 may compare the STO signal 314 to the STO feedback signal 315 to detect faults.

In the example material testing system 100, the travel of the moving crosshead 244 and any internal components is stopped after activation of the STO signal 314 as specified by international standards. Most of the subsystems of the safety system 240 disclosed herein activate the actuator disabling circuit 308 to safely stop the machine. Additionally, the power amplifier 310 may include a motor braking circuit 316 to decelerate the motor 242 before applying the STO signal 314. The motor braking circuit 316 allows the motor 242 to stop in a more controlled manner by eliminating continued movement by mechanical inertia after shutting down drive power. Using pre-disabling braking reduces or minimizes the motion of the crosshead 244 after the motor 242 is de-energized. Thus, the example actuator disabling circuit 308 and the motor braking circuit 316 provide a Category 1 stop as defined in the IEC 60204-1 standard, which is the "Electrical Safety Standard for Machinery."

The example safety processor 302 monitors the motor 242 and/or the motor braking circuit 316 while pre-disabling braking is occurring to confirm that the motor 242 is braking. If the safety processor 302 determines that the motor 242 is not slowing down during the braking, then the safety processor 302 performs a braking failure mitigation to cease the braking and immediately de-energize the motor 242. By implementing braking failure mitigation to the two-stage disabling sequence, the safety processor 302 may shorten stopping distance in situations in which the braking is ineffective. While the shortest stopping distance occurs when the pre-disabling braking is operative, when the pre-disabling braking is not completely operative, then a two-stage sequence involving an inoperative pre-disabling braking can have a longer stopping distance than a single-stage sequence (e.g., only disconnection). A secondary advantage of braking failure mitigation is that the mitigation enables more flexibility in implementing the two-stage disabling sequence, in that a wider range of components and systems can be used for high-performance braking with a braking failure mitigation process that can catch failures with the braking system.

The example safety system 240 further includes an emergency stop 318 (e.g., a button, a switch, etc.) that provides an emergency stop input signal 320 to the safety processor 302. The emergency stop 318 may be a manually operated emergency stop button, which is a complementary-type safety function. The emergency stop 318 includes two channel redundancy for signaling. The emergency stop 318 may include an emergency stop switch 322, emergency stop detection circuits 324, and an actuator disabling circuit 326. The emergency stop 318 is independently controllable using the hardware and embedded software of the safety processor 302. For example, in response to detecting the emergency stop input signal 320 from the emergency stop detector 324, the safety processor 302 sets the state of the material testing system 100 to the disable state and provides an emergency stop output signal 321 to the emergency stop 318 (e.g., to the emergency stop switch 322).

The emergency stop switch 322, in response to the emergency stop output signal 321, controls the actuator disabling circuit 326 to control the actuator disabling circuit 314 and/or the motor braking circuit 314 to stop the motor

242. The example actuator disabling circuit 326 may have a first connection to the motor braking circuit 314, and second redundant connections to the actuator disabling circuit 308. When the actuator disabling circuit 326 is triggered, the actuator disabling circuit 326 activates the motor braking circuit 314, delays for a time to permit the braking to occur, and then activates the actuator disabling circuit 308 to de-energize the applicable actuator.

In addition or as an alternative to control via the safety processor 302, the emergency stop switch 322 may directly actuate the actuator disabling circuit 308 within the power amplifier 310, such as by physical interruption of the STO signal 314 between the safety processor 302 and the actuator disabling circuit 308. The safety processor 302 monitors the emergency stop detection circuits 324 and acts as a redundant monitor to the hardware. The safety processor 302 outputs the STO signal 314 to control the actuator disabling circuit 308 to continue to disable the motor 242 so that, when the emergency stop switch 322 is released, the material testing system 100 will remain disabled (e.g., in a restricted state) and require user interaction to re-enable operation of the motor 242.

The example material testing system 100 (e.g., the test fixture 102) is compatible with interlock guarding systems with redundant or diverse contacts. The example safety system 240 may include one or more guards 328 and guard interlocks 330 configured to provide physical and/or virtual barriers to operator access to the material testing system 100 while operating in an unrestricted state. For example, the guards 328 may include physical barriers that are opened and closed to control access to the volume around the pneumatic grips 248 and/or the crosshead 244 (and/or other moving components). Example physical barriers include guard doors, which may use redundant safety switches to monitor whether the doors guarding the protected volume are open or closed. Each door switch has mechanically linked normally open and normally closed contacts, which may be dynamically pulsed (e.g., by the guard interlocks 330) and/or otherwise received as inputs. Pulsing permits plausibility diagnostic checking of the guard door switches in real time.

Additionally or alternatively, the guards 328 may include virtual guards that monitor the volume around the pneumatic grips 248 and/or the crosshead 244 for intrusion into the volume. Example virtual guards may include light curtains, proximity sensors, and/or pressure pads. While virtual guarding does not physically prevent access, the virtual guarding outputs guarding signals to the guard interlocks 330, which output interlock signals 332 to the safety processor 302 and/or actuator disabling circuit 308 (e.g., similar to the emergency stop switch 322 discussed above).

The interlocks 330 may trigger the actuator disabling circuit 308 to de-energize the motor 242. In some examples, the safety processor 302 controls re-enabling of the power amplifier 310 when the guard interlocks 330 are no longer triggered, in a similar manner as the emergency stop switch 322 discussed above.

Additionally or alternatively, the example safety system 240 may default to a restricted "setup" state when an operator enters the protected volume of the material testing system 100. Instead of disabling or de-energizing actuators of the system 100, the setup state enforces restrictions on speed, pressure, or other activities.

The example safety system 240 includes multiple state indicators 252 and mode switches 254. The example safety processor 302 monitors the mode switches 254 by, for example, dynamically pulsing the mode switches 254 to generate or obtain mode switch input signals 338 (e.g., one or more mode switch inputs for each of the mode switches 254). In some examples, the mode switches 254 are high-reliability switches. The safety processor 302 may test the mode switches 254 for short circuits or other faulty conditions periodically, aperiodically, in response to events (e.g., at startup of the material testing machine), on a predetermined schedule, and/or at any other times.

The example safety processor 302 controls the state indicators 252 to indicate the state of the material testing system 100 to the operator. For example, the safety processor 302 may output indicator signals 342 to the state indicators 252. If the state indicators 252 are lights, the output indicator signals 342 may, for example, control each of the lights to be on, off, flashing, and/or any other output for the lights. In some examples, the safety processor 302 determines the conditions of the indicators via indicator feedback signals 340. Example indicator feedback signals 340 may indicate to the safety processor 302 whether each of the state indicators 252 is on, off, short-circuited, open-circuited, and/or any other status or condition of the state indicators 252. If the processor determines that one or more of the state indicators 252 are not in the commanded proper state, the safety processor 302 controls the material testing system to be in a restricted state provides a notification to the operator (e.g., via the control panel 250 or other notification).

The safety system 240 includes a power supply monitor 344 to monitor the power supplies (e.g., DC and AC power supplies) that provide power to components of the material testing system 100. The power supply monitor 344 provides one or more power supply status signals 346 to the safety processor 302 and/or to the watchdog circuit 362 (described below) to indicate whether the monitored power supplies are within respective voltage and/or current ranges. If the power supply monitor 344 determines that one or more of the power supplies are out of tolerance, the safety processor 302 and/or to the watchdog circuit 362 may disable the material testing system 100 and alert the operator.

The example safety system 240 further includes one or more speed sensor(s) 348. The example speed sensor(s) 348 may be integrated, redundant, and/or diverse speed monitoring sensors. The speed sensor(s) 348 provide speed signal(s) 350, which are representative of the crosshead speed, to the safety processor 302. The safety processor 302 monitors the speed signal(s) 350 to ensure the crosshead 244 does not exceed an upper speed limit (e.g., crosshead travel limit(s) 352) as determined by the current operating mode of the machine. For example, the value of the upper speed limit may depend on whether the material testing system 100 is in a restricted state or an unrestricted state. In some examples, two speed sensors that operate on different principles may be used in the material testing system 100 to prevent the sensors 348 from sustaining common cause failures. The speed signal 350 of each speed sensor 348 is read and compared by the safety processor 302 to verify that the speed signals 350 are in agreement. If one speed sensor 348 indicates a different speed than another speed sensor 350, the safety processor 302 disables the material testing system 100 (e.g., via the actuator disabling circuit 308).

The example crosshead travel limit(s) 352 may include a travel limit that specifies a limit on the position of the crosshead 244. When the crosshead travel limit(s) 352 is reached, the safety processor 302 stops the motion of the crosshead 244. In some examples, the crosshead travel limit(s) 352 are multi-level limits, where the number of limits that are triggered indicate how far the crosshead travel limit(s) 352 have been exceeded. In some examples, a first level limit is handled by the safety processor 302 to stop operation of the applicable actuator (or all actuators), such as the motor 242. As the crosshead 244 continues to move beyond the first level limit and hits a second level limit (e.g., farther outside of the acceptable range than the first level limit), the crosshead travel limit 352 may trigger a direct connection (e.g., a hardware connection) to the actuator disabling circuit 308 and/or the motor braking circuitry 316, and/or to the actuator disabling circuit 326, to trigger the two phase disabling of the motor 242.

In some examples in which the material testing system 100 includes automatic gripping (e.g., pneumatically powered grips, hydraulically powered grips, electrically powered grips, electromechanically powered grips, electromagnetically powered grips, etc.), the safety system 240 includes a grip controller 354 that controls the grip actuators according to a multi-pressure gripping scheme. The multi-pressure gripping scheme reduces (e.g., minimizes, eliminates) the risk of injury to an operator when installing material test specimens in the material testing system 100 the pneumatic grips 248.

When the safety processor 302 is controlling the material testing system 100 in the setup state, the safety processor 302 provides a pressure signal 356 to the grip controller 354. The grip controller 354 controls the upper limit on the pressure that may be applied via the grips 248 by controlling the grip actuator(s) 246. The pressure signal 356 (which may be directly proportional to specimen gripping force) is limited to allow enough pressure to grip the specimen via the grips 248, but not enough pressure to cause severe injury to the operator. Conversely, when the safety processor 302 is controlling the material testing system 100 in the caution or testing states, the safety processor 202 provides the pressure signal 356 to cause the grip controller 354 to enable the higher pressure used to grip test specimens during testing. The example grip controller 354 may monitor the main system pressure (e.g., via pressure sensor(s) 358) and/or the pressure(s) in the pneumatic grip(s) 248 (e.g., upper and lower grips). The grip controller 354 feeds the pressure signals 360 to the safety processor 302 to verify that the commanded pressures are being enforced.

In some examples, the grip controller 354 is controlled via an operator input using a foot pedal switch. For example, the foot pedal switch may include separate switches to apply pressure and to release pressure via the pneumatic grip(s) 248. The switches may be mechanically linked switches, which may be dynamically pulsed to check for plausibility between the switches and/or to monitor for potential faults in the switches (e.g., electrical faults).

The safety processor 302 further controls the grip controller 354 to de-energize the grip actuator(s) 246 when power is disabled to the material testing system 100. For example, the safety processor 302 may control the grip actuator(s) 246 (e.g., via one or more valves, relays, etc.) to enable pressurization when powered, but to be normally depressurized for pneumatic actuators such that the pneumatic grip(s) 248 are prevented from applying grip force when the material testing system 100 is unpowered.

The example safety system 240 further includes a watchdog circuit 362. The watchdog circuit 362 communicates with the safety processor 302 periodically, aperiodically, in response to one or more events or triggers, and/or at any other time to verify the operation of the safety processor 302. For example, the safety processor 302 may communicate a heartbeat signal, or a response to a challenge from the watchdog circuit 362, to indicate to the watchdog circuit 362 that the safety system 240 is operating properly. If the watchdog circuit 362 does not receive an expected signal from the safety processor 302, the watchdog circuit 362 disables the material testing system 100 and notifies the operator.

The example safety processor 302, the example emergency stop 322, the example guard interlock 330, the example crosshead travel limit(s) 352, and/or the example watchdog circuit 362 are coupled (e.g., connected via hardware) to the actuator disabling circuit 326. When any of the safety processor 302, the emergency stop 322, the guard interlock 330, the crosshead travel limit(s) 352, and/or the watchdog circuit 362 determine that a respective condition is satisfied so as to disable the material testing system 100 (e.g., activation of the emergency stop switch 322, tripping of the guard 328, exceeding a crosshead travel limit 352, and/or triggering of the watchdog circuit 362), the actuator disabling circuit 326 is used to activate the motor braking circuit 316 and the actuator disabling circuit 308. The safety processor 302 may determine that the state of the material testing system 100 is the disabled state.

While the example control processor 238 and the safety processor 302 are illustrated as separate processors, in other examples the control processor 238 and the safety processor 302 may be combined into a single processor or set of processors that are not divided into control and safety functions. Furthermore, the control processor 238, the safety processor 302, and/or combined processors may include non-processing circuitry, such as analog and/or digital circuitry to perform one or more specialized functions.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A material testing system, comprising:
    a first actuator configured to control an operator-accessible component of the material testing system, wherein the operator-accessible component comprises an automatic grip or a manual grip configured to grip a material under test, wherein the actuator is configured to actuate the automatic grip or the manual grip;
    a crosshead configured to move the automatic grip or the manual grip to position the automatic grip or the manual grip or apply force to the material under test held by the automatic grip or the manual grip;
    a second actuator configured to actuate the crosshead;
    an actuator disabling circuit configured to disable the second actuator; and
    one or more processors configured to:
        control the second actuator based on a material testing process;
        monitor a plurality of inputs associated with operation of the material testing system;
        determine, based on the plurality of inputs and the material testing process, a state of the material testing system from a plurality of predetermined states, the predetermined states comprising one or more unrestricted states and one or more restricted states, wherein the one or more processors are configured to restrict at least one operation of the material testing system in the one or more restricted states, and the one or more processors are configured to reduce or remove at least one restriction of the one or more restricted states in the one or more unrestricted states;
        control the actuator disabling circuit based on the determined state;
        when the state of the material testing system is one of the one or more restricted states, limit a grip pressure produced by the first actuator to less than a threshold pressure and limit a crosshead speed generated by the second actuator to less than a threshold speed;
        when the state of the material testing system is one of the one or more unrestricted states, permit the grip pressure produced by the first actuator to exceed the threshold pressure and permit the crosshead speed generated by the second actuator to exceed a threshold speed.

2. The material testing system as defined in claim 1, wherein the one or more processors comprise a safety processor having a plurality of processing cores configured to:
    execute redundant code to monitor the plurality of inputs and to determine the state of the material testing system; and
    compare outputs of the redundant code, wherein at least one of the control of the actuator disabling circuit or control of a state output indicator is based on the comparison of the outputs.

3. The material testing system as defined in claim 1, wherein the plurality of inputs comprises a guarding input configured to indicate whether an operator is within a predetermined volume around the material testing system, and the one or more processors are configured to set the state of the material testing system in response to determining that the operator is within the predetermined volume.

4. The material testing system as defined in claim 3, further comprising at least one of a mechanically interlocked guard door or a light curtain, configured to output the guarding input.

5. The material testing system as defined in claim 3, wherein the one or more processors are configured to limit a speed of the second actuator in response to the guarding input.

6. The material testing system as defined in claim 1, further comprising a plurality of speed sensors configured to monitor a speed of the crosshead, the one or more processors configured to:
    compare speeds detected by the speed sensors; and
    when the compared speeds have more than a threshold difference, at least one of: a) set the state of the material testing system or b) disable operation of the material testing system.

7. The material testing system as defined in claim 1, wherein the plurality of inputs comprises an emergency stop input coupled to at least one of the one or more processors or the actuator disabling circuit, wherein at least one of the one or more processors or the emergency stop input is configured to control the actuator disabling circuit to disconnect the second actuator from the source of energy for the second actuator.

8. The material testing system as defined in claim 7, wherein the one or more processors are configured to control the actuator disabling circuitry to continue disconnection of the actuator from the source of energy after the emergency stop input is released until the one or more processors identify a user interaction to reconnect the second actuator to the source of energy.

9. The material testing system as defined in claim 1, further comprising a power supply monitor circuit configured to monitor a power supply of the material testing system, wherein the one or more processors are configured to at least one of set the state of the material testing system or disable operation of the material testing system in response to a signal from the power supply monitor circuit indicating that the power supply is out of tolerance.

10. The material testing system as defined in claim 2, wherein the state output indicator comprises at least one of a plurality of lights corresponding to the one or more unrestricted states and the one or more restricted states, or a display configured to display information about the material testing system.

11. The material testing system as defined in claim 10, wherein the one or more processors are configured to:
   monitor the state output indicator; and
   at least one of set the state of the material testing system or disable operation of the material testing system in response to detecting that the state output indicator is not outputting a state corresponding to the determined state.

12. The material testing system as defined in claim 1, wherein the one or more unrestricted states comprise:
   a caution state in which the one or more processors are reducing restrictions on the first actuator or the second actuator and are not controlling the first actuator or the second actuator to perform testing; and
   a testing state in which the one or more processors are reducing restrictions on the first actuator or the second actuator and are controlling the first actuator or the second actuator to perform testing.

13. The material testing system as defined in claim 1, wherein the one or more restricted states comprise:
   a setup state in which the one or more processors are restricting the first actuator or the second actuator and controlling the first actuator or the second actuator in response to operator inputs; and
   a disabled state in which the one or more processors are restricting the first actuator or the second actuator and do not control the first actuator or the second actuator in response to operator inputs.

14. The material testing system as defined in claim 1, wherein the first actuator or the second actuator comprises at least one of an electric motor, a pneumatic actuator, a hydraulic actuator, a piezoelectric actuator, a relay, or a switch.

15. The material testing system as defined in claim 1, wherein the one or more processors comprise:
   a control processor configured to perform the control of the first actuator or the second actuator; and
   one or more safety processors configured to perform the monitoring of the plurality of inputs, the determining of the state of the material testing system, and the controlling of the actuator disabling circuit.

16. A material testing system, comprising:
   an actuator configured to control an operator-accessible component of the material testing system;
   an actuator disabling circuit configured to disable the actuator;
   one or more processors configured to:
      control the actuator based on a material testing process;
      monitor a plurality of inputs associated with operation of the material testing system;
      determine, based on the plurality of inputs and the material testing process, a state of the material testing system from a plurality of predetermined states, the predetermined states comprising one or more unrestricted states and one or more restricted states, wherein the one or more processors are configured to restrict at least one operation of the actuator in the one or more restricted states, and the one or more processors are configured to reduce or remove at least one restriction of the at least one operation of the actuator in the one or more restricted states while in the one or more unrestricted states; and
      control the actuator disabling circuit based on the determined state; and
   an actuator braking circuit configured to, in response to a signal to disconnect the actuator from a source of energy, decelerate the actuator prior to the disconnection.

17. The material testing system as defined in claim 16, wherein the one or more processors are configured to:
   determine whether the actuator is decelerating by at least a threshold deceleration; and
   in response to determining that the actuator is not decelerating by at least the threshold deceleration, disconnect the actuator.

* * * * *